United States Patent [19]

Yagi

[11] Patent Number: 4,862,749
[45] Date of Patent: Sep. 5, 1989

[54] SHAFT TORSIONAL VIBRATION MONITOR FOR A MULTI-MASS ROTARY SHAFT SYSTEM

[75] Inventor: Yasuomi Yagi, Hitachi, Japan

[73] Assignee: Hitachi, Ltd., Tokyo, Japan

[21] Appl. No.: 174,423

[22] Filed: Mar. 28, 1988

[30] Foreign Application Priority Data

Mar. 27, 1987 [JP] Japan .................................. 62-71757

[51] Int. Cl.$^4$ ........................................... G01N 29/04
[52] U.S. Cl. ...................................................... 73/650
[58] Field of Search .................. 73/660, 650, 649, 659

[56] References Cited

U.S. PATENT DOCUMENTS

| | | | |
|---|---|---|---|
| 4,051,427 | 9/1977 | Kilgore et al. | 73/650 |
| 4,267,734 | 5/1981 | Shima et al. | 73/650 |
| 4,272,992 | 6/1981 | Shima et al. | 73/650 |
| 4,276,782 | 7/1981 | Shima et al. | 73/650 |
| 4,282,756 | 8/1981 | Molnar et al. | 73/650 |
| 4,294,120 | 10/1981 | Shima et al. | 73/650 |

*Primary Examiner*—Stewart J. Levy
*Assistant Examiner*—Louis M. Arana
*Attorney, Agent, or Firm*—Antonelli, Terry & Wands

[57] ABSTRACT

A shaft torsional vibration monitor for a poly phase turbine generator and its prime mover turbine connected thereto comprises an electrical torque detector detecting electromagnetic torque applied to the turbine generator rotor, a memory unit capable of storing plurality sets of torque variation data due to system disturbances each having an initial torque variation rate more than a predetermined amount, a first processor fetching the sets of torque variation data one by one from the memory unit and determining the corresponding shaft torsional vibration and a second processor determining fatigue and life expectancy of the rotary shaft system for the turbine generator and its turbine by accumulating torsional stresses caused by respective shaft torsional vibrations.

6 Claims, 2 Drawing Sheets

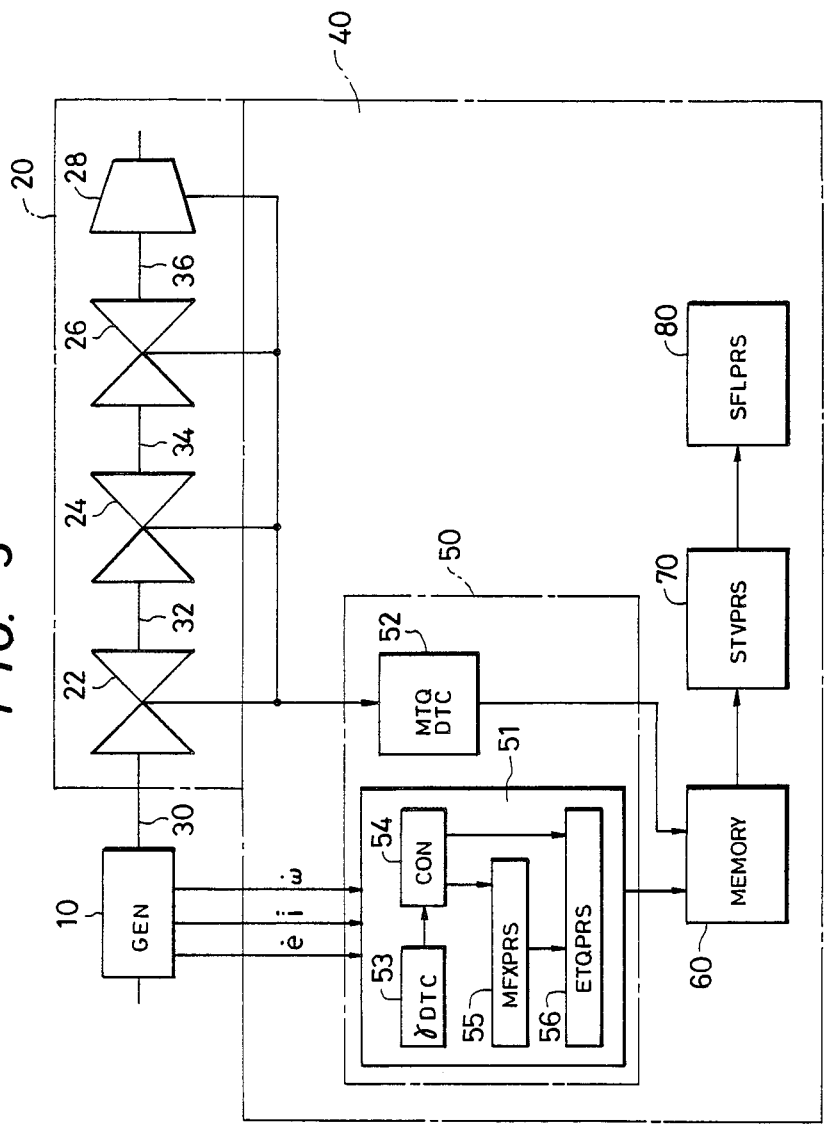

SHAFT TORSIONAL VIBRATION MONITOR FOR A MULTI-MASS ROTARY SHAFT SYSTEM

BACKGROUND OF THE INVENTION

The present invention relates to a shaft torsional vibration monitor for a multi-mass rotary shaft system, for example, a rotary shaft system of a turbine generator and its prime mover turbine connected thereto.

A shaft torsional vibration is induced in the rotary shaft system and connected turbine when a disturbance is caused by a system fault such as grounding and short circuiting followed by high speed reclosing occurs in a power transmission system to which the turbine generator is connected, or when a disturbance caused by a plant fault in a turbine plant from which the prime mover turbine is supplied with driving power. The shaft torsional vibration thus induced causes fatigue of the rotary shaft. Monitoring of the shaft torsional vibration is very important for the maintenance of the rotary shaft system.

A shaft torsional vibration is induced by a change of an external force applied to the rotary shaft system such as electrical torque applied to the turbine generator rotor and mechanical torque applied to the prime mover turbine rotor.

Under a steady-state operating condition, when both a change in the electrical torque due to a load change in the power transmission system and a change in the mechanical torque due to a turbine driving steam change, gas pressure change or gas flow rate change are small, the electrical torque and the mechanical torque applied to the turbine rotary shaft system balances and no substantial shaft torsional vibration is induced in the turbine rotary shaft system.

Under a non-steady-state operating condition such as a system disturbance caused by grounding or short circuiting fault in the power transmission system and the following high speed reclosing, the change in electrical torque applied to the turbine generator is substantial and the electrical torque and the mechanical torque applied to the turbine rotary shaft system becomes unbalanced and a shaft torsional vibration is induced to the turbine rotary shaft system.

An example of conventional shaft torsional vibration monitors for a turbine generator and its prime mover turbine connected thereto is disclosed in Japanese patent application laid open No. 58-22923 (1983) laid open on Feb. 10, 1983, which includes a plurality of shaft torsion detectors composed of a plurality of turning gears attached to the rotary shaft system and a corresponding number of pick-ups to detect relative shaft torsions, at the respective portions of the rotary shaft system in cooperation with the respective turning gears. The shaft torsional vibration monitor of Japanese patent application laid open No. 58-22923 further detects respective external forces applied to the turbine shaft system and processes both detected signals to determine the shaft torsional vibration induced to the turbine shaft system by solving equations of motion of the turbine shaft system.

Since the rotary shaft system of a turbine generator and its prime mover turbine connected thereto extends as long as several meters, it was necessary to measure shaft torsions at many points on the rotary shaft system. The number of the shaft torsion detectors to be attached was increased which increased the cost of the shaft torsional vibration monitor. Moreover when the shaft torsional vibration monitor must be added to an already installed rotary shaft system such as a turbine generator and its prime mover turbine connected thereto, positions and spaces for the attachment of the shaft torsion detectors of the shaft torsional vibration monitor are extremely limited.

SUMMARY OF THE INVENTION

One object of the present invention is to provide a shaft torsional vibration monitor for a multi-mass rotary shaft system which eliminates the necessity of conventional shaft torsion detectors.

Another object of the present invention is to provide a shaft torsional vibration monitor for a multi-mass rotary shaft system which effects a high degree of precision in the detection of the shaft torsional vibration induced in the rotary shaft system.

The shaft torsional vibration monitor for a multi-mass rotary shaft system of the present invention applies a conventional power transmission system analysis method disclosed, for example, in Takashi Watanabe et al. "Influence of High-speed Reclosing on Turbine-generators and the Shaft System" (Hitachi Review Vol. 27 (1978), No. 1, pp 33–38), wherein many kinds of electrical torque changes caused to a turbine generator rotor under several system disturbances are calculated in off-line by using power transmission system analyses, and the respective calculated electrical torque changes are applied to a spring mass model simulating the turbine rotary shaft system to determine shaft torsional vibration induced to the turbine rotary shaft system in off-line by solving equations of motion thereof.

The shaft torsional vibration monitor for a multi-mass rotary shaft system of the present invention comprises a torque detector torque applied to the rotary shaft system; a memory unit capable of temporarily storing at least two sets of torque variation data, each having an initial variation rate more than a predetermined variation rate, from the torque detector; a first processing unit receiving the respective sets of torque variation data one after another from the memory unit and calculating respective shaft torsional vibrations by solving equations of motion of a spring mass model simulating the rotary shaft system in accordance with the respective sets of torque variation data; and a second processing unit receiving the respective calculated shaft torsional vibrations one after another from the first processing unit and determining fatigue and life expectancy of the rotary shaft system caused by the respective calculated shaft torsional vibrations.

BRIEF DESCRIPTION OF THE DRAWINGS

FIG. 3 is a block diagram of one embodiment of the shaft torsional vibration monitor according to the present invention, applied to the multi-mass rotary shaft system shown in FIG. 1.

PRINCIPLE OF THE INVENTION

Figure 1:
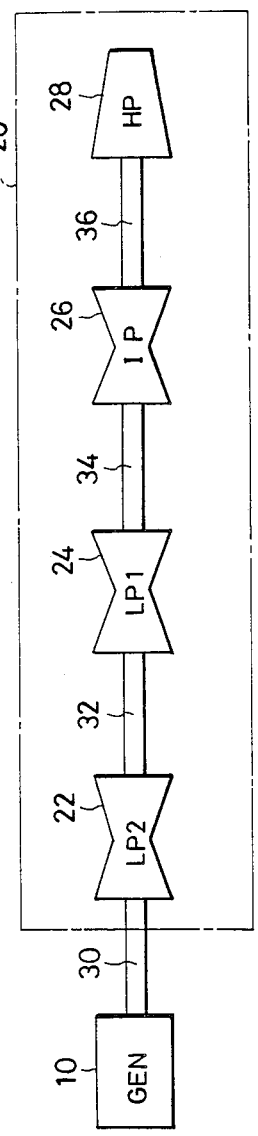
FIG. 1 is a schematic diagram illustrating a multi-mass rotary shaft system of a turbine generator and its prime mover turbine connected thereto, to which the shaft torsional vibration monitor for a multi-mass rotary shaft system of the present invention is applied.

In FIG. 1, a turbine generator 10 and its prime mover turbine 20 connected through a rotary shaft 30 constitute a multi-mass rotary shaft system. The prime mover turbine 20 is composed of a low pressure turbine No. 2 22, a low pressure turbine No. 1 24, an intermediate pressure turbine 26 and a high pressure turbine 28 connected respectively through rotary shafts 32, 34 and 36. The multi-mass rotary shaft system shown in FIG. 1 is simulated by a spring mass model as shown in FIG. 2.

The general equation of motion at a certain mass point of the multi-mass rotary shaft system simulated by the spring mass model is represented as follows, $$M_{i+1} \frac{d^2}{dt^2} (\delta_{i+1}) = K_{i,i+1} (\delta_i - \delta_{i+1}) - \\ K_{i+1,i+2} (\delta_{i+1} - \delta_{i+2}) + \\ D_{i,i+1} \frac{d}{dt} (\delta_i - \delta_{i+1}) - \\ D_{i+1,i+2} \frac{d}{dt} (\delta_{i+1} - \delta_{i+2}) - \\ D_{i+1,i+1} \frac{d}{dt} (\delta_{i+1}) + \\ T_{i+1} \tag{1}$$

wherein, $\delta_{i+1}$ represents an amount of change in torsional angle (rad) of the rotary shaft system at i+1 mass point, $K_{i,i+1}$ a torsional spring constant of the rotary shaft system between mass points i and i+1, $D_{i,i+1}$ an attenuation constant of the rotary shaft system between mass points i and i+1, $D_{i+1,i+1}$ an attenuation constant of the rotary shaft system at mass point i+1 such as wind loss, $M_{i+1}$ an inertia constant of mass point i+1 and $T_{i+1}$ an amount of change in torque applied to mass point i+1, wherein i is a positive integer including zero.

Figure 2:
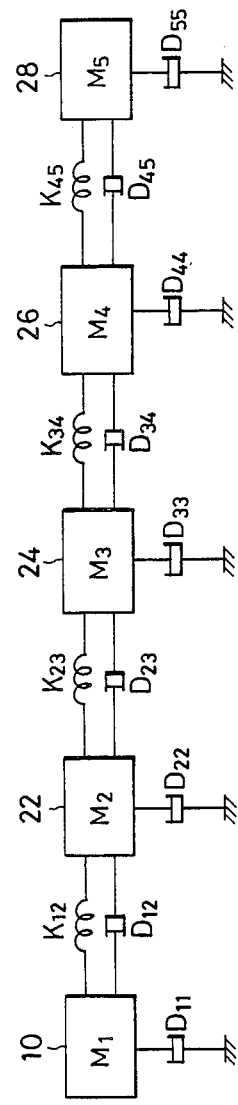
FIG. 2 is a spring mass model simulating the multi-mass rotary shaft system shown in FIG. 1.

When the above equation of motion (1) is applied to the spring mass model shown in FIG. 2 having five mass points, five second-order differential equations to be solved step by step are establish. However, since these five second-order differential equations are equivalent to the following ten one-order differential equations (2)–(11), the shaft torsional vibrations of the rotary shaft system at respective mass points are obtained by solving step by step the following ten one-order differential equations (2)–(11);

$$\frac{d}{dt} \delta_1 = v_1 \tag{2}$$

$$\frac{d}{dt} \delta_2 = v_2 \tag{3}$$

$$\frac{d}{dt} \delta_3 = v_3 \tag{4}$$

$$\frac{d}{dt} \delta_4 = v_4 \tag{5}$$

$$\frac{d}{dt} \delta_5 = v_5 \tag{6}$$

$$\frac{d}{dt} v_1 = \frac{-K_{1,2}}{M_1} (\delta_1 - \delta_2) - \frac{D_{1,2}}{M_1} (v_1 - v_2) - \\ \frac{D_{1,1}}{M_1} v_1 + \frac{T_1}{M_1} \tag{7}$$

$$\frac{d}{dt} v_2 = \frac{K_{1,2}}{M_2} (\delta_1 - \delta_2) - \frac{K_{2,3}}{M_2} (\delta_2 - \delta_3) + \\ \frac{D_{1,2}}{M_2} (v_1 - v_2) - \frac{D_{2,3}}{M_2} (v_2 - v_3) - \frac{D_{2,3}}{M_2} v_2 + \frac{T_2}{M_2} \tag{8}$$

$$\frac{d}{dt} v_3 = \frac{K_{2,3}}{M_3} (\delta_2 - \delta_3) - \frac{K_{3,4}}{M_3} (\delta_3 - \delta_4) + \tag{9}$$

-continued $$\frac{D_{2,3}}{M_3} (v_2 - v_3) - \frac{D_{3,4}}{M_3} (v_3 - v_4) - \frac{D_{3,3}}{M_3} v_3 + \frac{T_3}{M_3}$$

$$\frac{d}{dt} v_4 = \frac{K_{3,4}}{M_4} (\delta_3 - \delta_4) - \frac{K_{4,5}}{M_4} (\delta_4 - \delta_5) + \tag{10}$$

$$\frac{D_{3,4}}{M_4} (v_3 - v_4) - \frac{D_{4,5}}{M_4} (v_4 - v_5) - \frac{D_{4,4}}{M_4} v_4 + \frac{T_4}{M_4}$$

$$\frac{d}{dt} v_5 = \frac{K_{4,5}}{M_5} (\delta_4 - \delta_5) + \frac{D_{4,5}}{M_5} (v_4 - v_5) - \tag{11}$$

$$\frac{D_{5,5}}{M_5} v_5 + \frac{T_5}{M_5}$$

wherein $v_1$–$v_5$ represents torsional vibration angular velocities (rad) at respective mass points.

The system disturbance usually continues several seconds, from occurrence of the disturbance to its ceasing.

The shaft torsional vibrations of the rotary shaft system at respective mass points are obtained by solving step by step the above equations (2)–(11) while only employing detected torque variations at respective mass points of the rotary shaft system, assuming that there is no torsional vibration at the initial condition and using a numerical analysis method such as Runge-Kutta-Gill method and trapezoidal method without actual measurement of the relative torsional angle at several points on the rotary shaft system which was needed with the conventional shaft torsion detector.

Further a time step $\Delta t$ when solving the above equations (2)–(11), in other words a signal sampling period, should be less than 1 msec for exactly simulating the shaft torsional vibration of the rotary shaft system induced by an electrical torque by a frequency (frequency: 100/120 Hz, period: 10/9.3 msec) twice the fundamental frequency generated by a negative phase current caused at the time of a grounding fault.

A microprocessor employed for a shaft torsional vibration monitor should be a reasonable size so that a processing time of about 30 msec with such microprocessor is needed to simulate the shaft torsional vibration during the one time step $\Delta t$ of 1 msec by solving the above ten one-order differential equations (2)–(11) while using for example Runge-Kutta-Gill method. Therefore in order to exactly simulate the shaft torsional vibration induced by a system disturbance which actually continues for several seconds, a processing time of more than several times the actual shaft torsional vibration period, or approximately a few minutes with such microprocessor, is necessary.

DESCRIPTION OF THE PREFERRED EMBODIMENT

FIG. 3 shows a schematic block diagram of a shaft torsional vibration monitor 40 of one embodiment of the present invention applied to the rotary shaft system of a turbine generator 10 and its prime mover turbine 20 as shown and explained in connection with FIGS. 1 and 2.

The shaft torsional vibration monitor 40 is composed of a torque detector 50 which detects electrical and mechanical torques applied to the rotary shaft system at the respective mass points, a memory unit 60 capable of storing a plurality of sets of torque variation data caused by disturbances, from the torque detector 50, a shaft torsional vibration processing unit 70 which fetches the sets of torque variation data one after another from the memory unit 60 and determines shaft torsional vibration induced to the rotary shaft system and a shaft fatigue and life expectancy processing unit 80 which receives torsional stress data corresponding to the respective shaft torsional vibrations from the shaft torsional vibration processing unit 70 and determines shaft life expenditure by classifying the torsional stresses by magnitude, weighing the classified torsional stresses and integrating the weighed torsional stresses with respect to each shaft torsional vibration due to each disturbance and by accumulating the integrated torsional stresses of the respective shaft torsional vibrations due to disturbances over a period of time.

The torque detector 50 is composed of an electrical torque detector 51 which detects an external electrically induced force applied to the rotor of the turbine generator 10, and a mechanical torque detector 52 which detects another external force applied to the respective rotors of the low pressure turbine No. 2 22, the low pressure turbine No. 1 24, the intermediate pressure turbine 26 and the high pressure turbine 28.

The electrical torque detector 51 detects terminal voltage e and current i and rotating angular velocity $\omega$ of the poly phase turbine generator 10 and outputs to the memory unit 60 a set of torque variation data for 30 seconds having a predetermined torque variation rate due to a system disturbance.

The mechanical torque detector 52 detects steam pressures and flow rates thereof to the respective turbines and governor conditions thereof and outputs to the memory unit 60 a set of torque vibration data for 30 seconds having a predetermined torque variation rate due to a turbine plant disturbance.

The electrical torque detector 51 is composed of a $\gamma$ detector 53 which determines a deviation angle $\gamma$ of the direct axis of the rotor to the magnetic flux direction caused by an armature current flowing through a predetermined armature phase winding, in other words, a direction of winding axis of a predetermined armature phase winding, of the turbine generator 10. Also included in torque detector 51 is a dq convertor 54 which converts the poly phase terminal voltage e and current i of the turbine generator 10 into direct and quadrature axis voltage and current components thereof by using the deviation angle $\gamma$ from the $\gamma$ detector. Further, a magnetic flux processing element 55 determines direct and quadrature axis magnetic flux components induced by the armature winding of the turbine generator 10 using the direct and quadrature axis voltage and current components from the dq convertor 54. Additionally, included in the torque detector 51 is an electrical torque processing element 56 which determines an electromagnetic torque or an air gap torque by using the direct and quadrature axis current and magnetic flux components obtained respectively from the dq convertor 54 and the magnetic flux processing element 55. Since the electrical torque detector 51 determines the electrical torque applied to the rotor of the turbine generator 10 by its electro-magnetic torque which is not affected by a sudden transient change of the terminal voltages of the turbine generator 10, the electrical torque detector 51 determines a precise set of torque variation data due to a system disturbance in particular during the initial transient period thereof which enhances a precise monitoring of shaft torsional vibration induced in the rotary shaft system.

The capacity of the memory unit 60 is determined such that when a plurality of system disturbances occur intermittently in a few minutes before the processing of a first set of torque variation data in the shaft torsional vibration processing unit 70 is connected, the memory unit 60 is able to store temporarily the torque variation data caused by the subsequent system disturbances. Thereby the shaft torsional vibration monitor 40 eliminates dead zone for the torque variations due to system disturbances occurring in a short interval.

The shaft torsional vibration processing unit 70 determines shaft torsional vibrations induced to the rotary shaft system by solving the equations (2)–(11) step by step through Runge-Kutta-Gill method by applying the fetched sets of torque variation data from the memory unit 60 and assuming that there is no torsional vibration at the initial condition.

The mechanical torque detector 52 in the torque detector 50 of the above embodiment may be excluded, because a change rate of the mechanical torque applied to the turbine is, practically speaking, very small in comparison with that of the electrical torque applied to the turbine generator, and is negligible in many cases.

Although the torque variation data sampling time covering one set of torque variation data in the above embodiment is set to be 30 seconds, the data sampling time is not limited to the specific time and may be variable in such a manner that the data sampling is stopped when a torque variation rate decreases below a predetermined amount.

I claim:

1. A shaft torsional vibration monitor for a multi-mass rotary shaft system comprising,
    a torque detector for detecting torque applied to the rotary shaft system;
    a memory unit capable of storing temporarily at least two sets of torque variation data due to a disturbance, each having an initial variation rate more than a predetermined variation rate from said torque detector;
    a first processing unit receiving the respective sets of torque variation data one after another from said memory unit and calculating respective shaft torsional vibrations corresponding to the respective torque variations by solving equations of motion of a spring mass model simulating the multi-mass rotary shaft system; and
    a second processing unit receiving the respective calculated shaft torsional vibrations one after another from said first processing unit and determining fatigue and life expectancy of the multi-mass rotary shaft system by accumulating torsional-stresses caused by the respective calculated shaft torsional vibrations.

2. A shaft torsional vibration monitor for a multi-mass rotary shaft system according to claim 1, wherein the multi-mass rotary shaft system is made up of a poly phase turbine generator and its prime mover turbine connected thereto and said torque detector detects electrical torque applied to the turbine generator.

3. A shaft torsional vibration monitor for a multi-mass rotary shaft system according to claim 2, wherein said torque detector further detects mechanical torque applied to the prime mover turbine.

4. A shaft torsional vibration monitor for a multi-mass rotary shaft system according to claim 2, wherein said torque detector detects electromagnetic torque as the electrical torque.

5. A shaft torsional vibration monitor for a multi-mass rotary shaft system according to claim 2, wherein said torque detector detects terminal phase voltages and currents and rotary angular velocity of the poly phase turbine generator and includes a γ detector determining an angle difference γ between the direct axis of the turbine generator rotor and a direction of winding axis of a predetermined armature phase winding in the turbine generator armature winding by using the detected phase voltages and the rotating angular velocity, a dq convertor converting the detected terminal phase voltages and currents into direct and quadrature axis voltage and current components by using the determined angle γ difference γ from said γ detector, a first processing element determining direct and quadrature axis magnetic flux components induced by the turbine generator armature winding by using the resultant direct and quadrature axis voltage and current components from said dq convertor, and a second processing element determining the electromagnetic torque by using the direct and quadrature axis current components obtained from said dq convertor and the direct and quadrature axis magnetic flux components obtained from said first processing elements.

6. A shaft torsional vibration monitor for a multi-mass rotary shaft system according to claim 5, wherein said torque detector further detects mechanical torque applied to the prime mover turbine.

* * * * *